Figure 1:
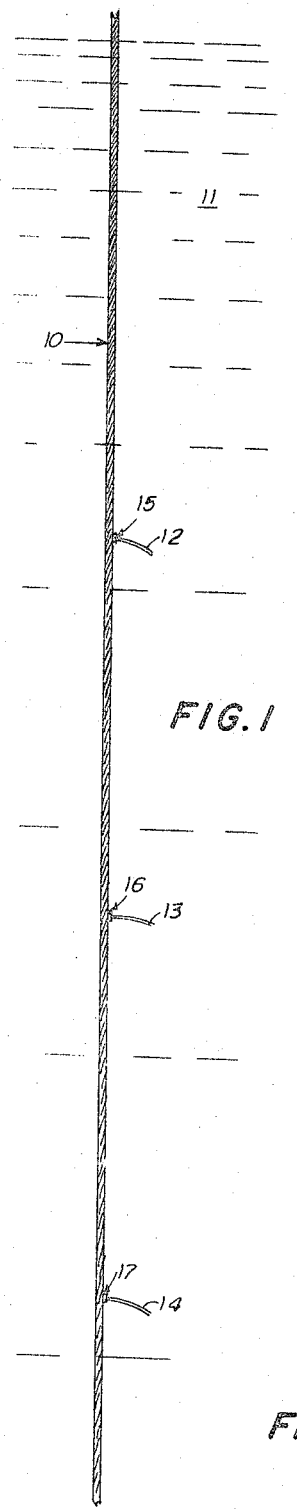

April 4, 1967

S. L. LOVETT, JR., ETAL 3,312,777

ARMORED ELECTRICAL CABLE BREAKOUT

Filed Aug. 19, 1964

INVENTORS
STANLEY L. LOVETT, JR.
FREDERICK W. KUHLS
BY Fisher, Christen, Sabol & Caldwell
ATTORNEYS United States Patent Office 3,312,777
Patented Apr. 4, 1967

3,312,777
ARMORED ELECTRICAL CABLE BREAKOUT
Stanley L. Lovett, Jr., and Frederick W. Kuhls, Culpeper, Va., assignors to Rochester Ropes, Inc., Culpeper, Va., a corporation of Virginia
Filed Aug. 19, 1964, Ser. No. 390,681
2 Claims. (Cl. 174—71)

This invention relates to electrical networks, and more particularly to a system for establishing electrical connections between one or more measuring, or sensing, devices located below the surface of a body of water and a recording device, or other electrical system located above the surface.

In the study of the characteristics of the oceans at different levels, it is necessary to provide a vertically extending electrical cable containing a plurality of conductors, suspended at its upper end from a vessel floating on the sufrace or from some permanent mooring where the recording instrument or instruments are located.

In such a situation one or more sensing instruments will be located in the water at various levels below the surface and some means must be provided for establishing an electrical circuit through secondary conductors between the suspended cable and the various sensing instruments. Because the primary conductors contained within the vertical cable must be protected against contact with underwater bodies these cables are usually armored and the connection between these primary conductors and the secondary conductors at the various levels can only be obtained by providing an opening through the protective armor covering through which the secondary conductors can pass. The means by which this is accomplished is called a breakout.

The type of cable with which the breakout of the present invention is to be employed includes an armor coating comprising two sets of wire strands helically wound about the insulated conductors in opposite directions. Such cables are known in the art as torque compensating armored cables because the twisting moment of the inner layer of strands is equal and opposite to the twisting moment of the outer layer.

In the present invention the secondary conductors are led out directly through the two layers of armor wire and a protective device, which includes a metal element surrounding the secondary conductor is positioned at the breakout to prevent the armor wires from crushing the secondary conductor or its insulating coating.

It is therefore an object of this invention to provide a network of electrical conductors including a plurality of armored covered primary conductors connected with one or more spaced secondary conductors connected with the primary conductors through a series of breakout means incorporated in the armored cable.

It is also an object of the invention to provide a protective device capable of use with torque compensating armored cable for use in providing a breakout for a secondary conductor.

It is a further object of this invention to provide means whereby a breakout may be made at a medial point along the length of an armored electrical cable without severing any of the armor wires at the breakout.

It is yet another object to provide a breakout at a medial point in an armored electrical cable which eliminates the necessity for a special electrical connector means at the breakout.

Figure 2:
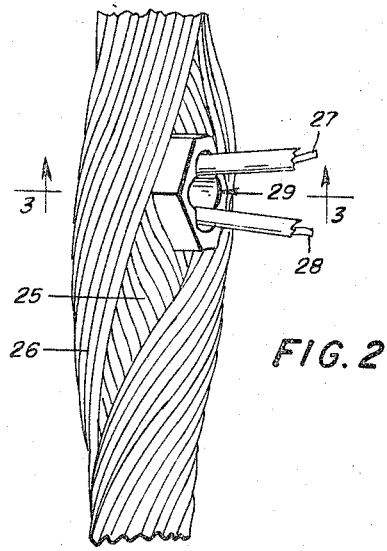
Figure 3:
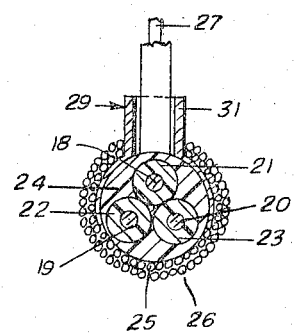
Figure 4:
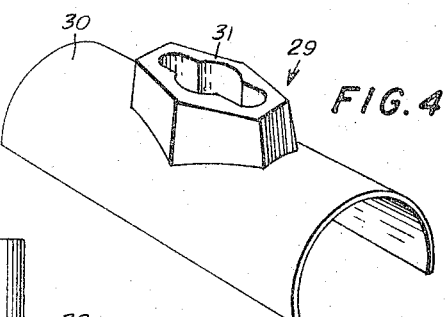
Figure 5:
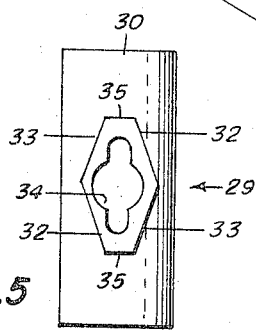

Other objects and advantages of the invention will be apparent to those skilled in the art after reading the following specification in connection with the annexed drawings, in which, FIGURE 1 is a view in elevation of a vertically suspended underwater armored electrical cable provided with several taps or breakouts at spaced levels constructed in acordance with the preesnt invention; FIGURE 2 is a side elevation of one of the breakouts shown in FIGURE 1 but on a greatly enlarged scale; FIGURE 3 is a cross-sectional view taken on line 3—3 of FIGURE 2; FIGURE 4 is a perspective view of a protective saddle which forms one of the elements of the breakout connection, and ; FIGURE 5 is a plan view of the saddle shown in FIGURE 4.

Referring now to the drawings in detail, the numeral 10 indicates generally an armored cable having one or more insulated electrical conductors suspended at one end from a vessel or other support (not shown) so as to extend vertically downwardly below the surface of a body of water, indicated generally by numeral 11, and having laterally extending conductors 12, 13, and 14, each connected with a conductor within the cable 10 and protected respectively by breakout devices indicated generally by numerals 15, 16, and 17.

FIGURES 2 and 3 illustrate details of construction of one of the breakouts shown in FIG. 1, but in these figures the cable is shown as including only three conductors 18, 19, and 20, each of which is embedded in an insulating coating indicated respectively by numerals 21, 22, and 23 and then embedded in an outer covering of plastic insulation 24.

Cables of this type are often uesd for underwater exploration where it is desired to establish an electrical connection with one or more measuring devices, or electrical sensing means, positioned in the water below, sometimes at great depth. It is therefore necessary to protect the wires or conductors 18, 19, and 20 with an armored covering which will not only sustain the weight of the cable (which may extend for thousands of feet below the surface of the water) but also to protect relatively soft insulating covering of the conductors against damage which might be caused with contact with underwater objects, either of natural origin or man made.

In the present instance this armored coating may comprise a first layer of closely packed helically wound metal wire strands 25, which may be wound in a clockwise direction for example, followed by a second layer of closely packed helically wound wire strands 26 which would be wound in a counterclockwise direction. This method of armoring is well known in the art and can be accomplished by conventional wire stranding machines.

The number of strands wound simultaneously in forming each layer may vary between approximately sixteen and forty, and in order to prevent untwisting of the wires when the cable is placed in tension the two layers of wires are wound in opposite directions. Furthermore, since the outer layer has a pitch circle of greater radius than the inner layer must have a slightly different pitch angle than the inner layer in order to equalize the difference in the rotational moment of force exerted by the two layers. The construction of torque compensated armored cables of this type is well known in the cable making art.

However, no method, or apparatus, has previously been developed for making a breakout for connecting a secondary conductor to a main conductor at a medial point along the length of the main conductor which did not require the armor wires to be severed at the breakout to allow the insertion of a special connector.

In the present invention, the main conductors 18, 19, and 20 are first incased in their insulating coating along their entire length. Thereafter, at the locations where it is desired to make a breakout to attach a tap wire, or secondary conductor such as the conductors 27 and 28, the insulation is removed from the main conductor and from the end of the secondary conductor and an electrical connection is made between the two such as by soldering. Then the entire joint is encased in a generally T- shaped mold and a plastic insulating material is injected into the mold to surround the wires and to replace the insulating material which was removed to make the joint so that the replaced insulating material forms a smooth continuation of the insulation on all of the conductors.

The preparation of the taps for the secondary conductors along the entire length of the main conductors can be done prior to starting the armoring process, or the joints with the secondary conductors may be prepared during the armoring process, when a tandem stranding machine is used to apply the armor wires.

In either case, the stranding machine is stopped just prior to the passage of a prepared joint through the machine, and at this point a protective saddle, indicated generally by numeral 29, is applied to the joint.

This saddle includes a generally rectangular shield 30, preferably made of some malleable and corrosion resistant metal sheet material formed in a generally semi-cylindrical shape to partially surround the outer insulation 24 of the main conductors for a short distance on either side of the location where the joint, or tap, has been made. The rectangular shield is provided with a central opening which may be either round, oval, or slotted, depending on the number of wires to be led out through it, and this opening is surrounded on the outer side of the shield with a radially projecting solid boss or "conning tower" 31.

A particular feature of this conning tower is the fact that it is provided with a first pair of parallel opposite flat sides 32, angularly related to a second pair of flat parallel opposite sides 33. The angle of the first pair of sides 32 will be parallel with the pitch of the strands of one of the armored coverings, say the first set of wires 25 and the angle of the second pair of sides 33 will be parallel in that case with the pitch of the strands of the second layer 26.

The boss or conning tower 31 is also provided with a passage 34 extending radially upwardly from the main conductors to permit passage of the secondary conductors. After the saddle has been put in place, with the shield extending partially around the insulation 24, the stranding operation is continued by hand until the inner layer of strands 25 have been wound over the shield and against both sides 32 of the "conning tower." Next, the strands 26 are wound in place over the inner layer of strands and against the rides 33 of the "conning tower." After this the stranding can be continued by the machine until the next breakout is reached, or the cable is completed.

It will be observed that the boss 29 projects radially outwardly at least as far as the outer surface of the outer layer of armor wires and, preferably, slightly beyond. Because the sides 32 and 33 are flat and lie parallel with the wires, they cannot ride up, even when they are under tension caused by the weight of supporting the cable, and the wires 27 and 28 cannot be pinched or cut off. Usually, the insulation molded over the joint is slightly greater in diameter than the insulation covering the remainder of the wire and this, plus the thickness of the shield causes a slight bulge (as shown in FIG. 2) and this helps to cushion the armor wires and allow for a slight amount of "give" if a sudden force is applied to the cable.

In addition to the fact that no special connectors are required to make the breakout disclosed in this invention, each of the armor wires extends in one continuous unbroken length from one end of the cable to the other, regardless of the number of breakouts. Thus, the strength of the cable is substantially equal to that of a cable without a breakout, and the weight of the cable having breakouts of this type is only slightly increased over a plain armored cable.

It will be evident that any number of secondary conductors can be attached at a single breakout, depending only on the size of the opening 34 in the "conning tower." It will also be obvious that any number, and type of conductors, can be included in the armored cable 10, and that they can be insulated or not.

Having disclosed one form in which the invention can be practiced it will be apparent that various improvements and modifications may be made, which would come within the scope of the annexed claims.

We claim:

1. A protective device for a breakout in an underwater torque compensating armored cable with two layers of metal strands wound helically in respectively opposite directions over an electrical conductor having an insulating coating; a saddle composed of a semi-cylindrical sheet of metal for partially enclosing a length of said insulating coating below said two layers of metal strands and having a central opening therein to permit the passage of a lateral electrical conductor, a boss on the exterior side of said sheet of metal surrounding said opening to project radially outwardly beyond the two layers of metal strands, said boss having a radial passage for the lateral conductor and having two pairs of parallel opposite exterior flat surfaces extending generally radially of the cable axis, each pair of surfaces being parallel with the pitch of a respective layer of said helically wound metal strands.

2. The invention as defined in claim 1, wherein said saddle comprises corrosion resistant metal.

References Cited by the Examiner

UNITED STATES PATENTS

| | | | |
|---|---|---|---|
| 952,161 | 3/1910 | Whyte | 174—128 |
| 1,904,116 | 4/1918 | Baum | 174—128 |
| 3,168,614 | 2/1965 | Munn et al. | 174—70 |
| 3,235,651 | 2/1966 | Tepner | 174—71 X |

LARAMIE E. ASKIN, *Primary Examiner.*

J. F. RUGGIERO, *Assistant Examiner.*